United States Patent [19]

Halgrimson et al.

[11] 4,356,850
[45] Nov. 2, 1982

[54] VENEER LATHE SCANNING SYSTEM

[75] Inventors: Darrell N. Halgrimson, Edmonds; Donald H. Hanson, Arlington; Richard T. King, Mountlake Terrace, all of Wash.

[73] Assignee: Black Clawson, Inc., Everett, Wash.

[21] Appl. No.: 191,884

[22] Filed: Sep. 29, 1980

[51] Int. Cl.³ .............................................. B27B 1/00
[52] U.S. Cl. ........................ 144/209 R; 144/209 A; 367/96
[58] Field of Search ............... 144/209 R, 209 A; 367/96, 127; 250/560; 356/383, 385, 398, 384, 386; 364/560, 561, 556

[56] References Cited

U.S. PATENT DOCUMENTS

| | | | |
|---|---|---|---|
| 3,513,321 | 5/1970 | Sherman | 144/209 A X |
| 3,736,968 | 6/1973 | Mason | 144/312 |
| 3,746,065 | 7/1973 | Mason | 144/209 A X |
| 3,806,253 | 4/1974 | Denton | 144/209 A X |
| 3,852,579 | 12/1974 | Sohn et al. | 144/209 R X |
| 3,992,615 | 11/1976 | Bennett et al. | 144/209 R X |
| 4,139,035 | 2/1979 | Bystedt et al. | 144/312 |
| 4,152,767 | 5/1979 | Laliotis | 356/386 |

Primary Examiner—W. D. Bray
Attorney, Agent, or Firm—Biebel, French & Nauman

[57] ABSTRACT

A pair of sonic transducers are mounted above a peeler block on a veneer lathe, adjacent opposite ends of the block. Bursts of sonic energy are directed downward to strike the surface of the block such that sonic energy is reflected from the block surface to the transducers. The distance from the transducers to the axis of rotation of the lathe spindle upon which the block is mounted is known and, as a consequence, the radius of the peeler block may be determined in response to the ultrasonically measured distance from the transducers to the block surface. A series of radius measurements may be made as the block is rotated on the lathe spindle. Additionally, measurements may be made when a log is first loaded onto the lathe, after the log is rounded up, and after peeling of the block is completed.

12 Claims, 7 Drawing Figures

VENEER LATHE SCANNING SYSTEM

BACKGROUND OF THE INVENTION

The present invention relates to a scanning device for use with a veneer lathe and, more particularly, to such a device including one or more ultrasonic transducers for providing an indication of the diameter of a peeler block or log mounted on the spindle of the lathe.

In the lumber industry, wood veneer is produced utilizing a veneer lathe. A log or "peeler block" of appropriate length is clamped in the rotatable spindle of the veneer lathe and presented to a veneer peeling knife which extends along the entire length of the block. The log is initially rounded up on the lathe into a peeler block of uniform radius. Thereafter, the spindle is rotated and the knife is moved radially inward to peel a continuous layer of veneer from the outside of the block, continuing along a spiralling path toward the block center. The peeling operation is completed when only a small cylindrical core of wood is left.

It is desirable to monitor the amount of wood supplied to the lathe and to keep an accurate record of both the amount of veneer and the amount of scrap produced. Specifically, it is desirable to be able to record the gross log diameter, the diameter of the peeler block after it has been rounded up into a cylindrical shape on the lathe, and the diameter of the core which is left after the peeling operation is completed.

Prior art systems for making such measurements have generally been limited to optical scanning of a log prior to loading it onto the veneer lathe. Such optical scanning systems are relatively complicated and typically are subject to error. Additionally, they may also be limited in the resolution obtainable. Systems such as shown in U.S. Pat. No. 3,806,253, issued Apr. 23, 1974, to Denton, as shown in U.S. Pat. No. 4,139,035, issued Feb. 13, 1979, to Bystedt, or as shown in U.S. Pat. No. 4,152,767, issued May 1, 1979, to Laliotis, in which the log image is focussed onto an array of photosensitive transducers, such as photodiodes, may be limited in accuracy in that the measurement is actually based upon converging light rays which are tangential to the log surface generally on opposite sides of the log, but not at points directly opposed along a log diameter.

Another type of optical scanning device is shown in U.S. Pat. No. 3,746,065, issued July 17, 1973, to Mason, in which the log is transported through a scanning area in a direction perpendicular to the axis of the log. A row of light sources and an opposing row of sensors on opposite sides of the scanning area extend generally perpendicular to the direction of log movement. The log is thereafter rotated by 90° and transported again through the scanning area. While providing greater accuracy, the Mason system requires a substantial amount of equipment and the requirement of passing the log through the scanning area twice limits the log scanning speed.

U.S. Pat. No. 3,513,321, issued May 19, 1970, to Sherman, discloses a log tally system in which the log is transported through a scanning station in a direction parallel to the axis of the log with a row of light sources and an opposing row of light sensors being provided on opposite sides of the scanning station. Each of the rows is arranged generally perpendicularly with respect to the direction of log movement. In this system, the resolution of measurement is limited by the spacing between adjacent sensors.

Another type of optical scanning system is disclosed in U.S. Pat. Nos. 3,852,579, issued Dec. 3, 1974, to Sohn et al., and 3,992,615, issued Nov. 16, 1976, to Bennett et al. In this system, the log is mounted on a rotatable spindle of a charger mechanism and rotated thereon for determining the radius of the log at a number of angularly displaced points around the log periphery. The measurement is accomplished by directing a narrow beam of modulated light to strike the surface of the log. Light reflected from the log is received and focussed upon a photodetector for demodulation. The distance to the log surface from the light source is determined by measuring the relative phase of the modulating and detected signals. This system, however, is relatively complicated.

Accordingly, it is seen that there is a need for a simple, accurate log scanning system for scanning a log mounted on a veneer lathe, to monitor the radius of the log or peeler block prior to, during, and after peeling.

SUMMARY OF THE INVENTION

A veneer lathe for peeling wood veneer from a log includes a rotatable lathe spindle for engaging the log at opposite ends thereof and drive means connected to the spindle for rotating the spindle and a log engaged thereby. A lathe knife means is provided for cutting a log mounted on the spindle and peeling a sheet of veneer from the log as the log is rotated. A means is provided for advancing the knife means toward the log at a controlled rate during rotation of a log such that a sheet of veneer of substantially uniform thickness is peeled therefrom. At least one sonic transducer is mounted adjacent the log for directing bursts of sonic energy toward the log and receiving reflected sonic energy therefrom during operation of the lathe. The time delay between transmission of a burst of sonic energy from the transducer and reception of reflected sonic energy by the transducer provides an indication of the radius of the log.

The lathe may include first and second sonic transducers mounted above the log for directing bursts of sonic energy downward against the log surface. The first transducer directs bursts of sonic energy for reflection from the log surface adjacent a first end of the log and the second transducer directs bursts of sonic energy downward for reflection from the log surface adjacent a second end of the log, opposite the first end. An angular encoder means may be connected to the spindle of the veneer lathe for providing an indication of the angular orientation of the peeler block during scanning thereof.

The radius of the log mounted for axial rotation on the spindle of a veneer lathe is determined by the steps of:

transmitting a burst of sonic energy from a reference point toward the log surface, the reference point being a predetermined distance from the axis of rotation of the spindle, receiving sonic energy at the reference point, which sonic energy is reflected from the log surface, measuring the time interval between transmission of the burst of sonic energy from the reference point and reception of reflected sonic energy at the reference point, determining the distance from the reference point to the log surface based upon the measured time interval, and determining the radius of the log by subtracting the distance from the reference point to the log surface from the predetermined distance.

Accordingly, it is an object of the present invention to provide a veneer lathe scanner and method for determining the radius of a log mounted on the spindle of the lathe; to provide such a scanner and method in which scanning is accomplished utilizing ultrasonic energy; to provide such a scanner and method in which the sonic energy is transmitted downward from one or more scanners to strike the log surface and is thereafter reflected upward for reception by the transducer or transducers; and to provide such a scanner and method in which measurements are taken for determining the radius of a log adjacent both of its ends and at angularly displaced points around the log periphery.

DETAILED DESCRIPTION OF THE PREFERRED EMBODIMENTS

Figure 1:
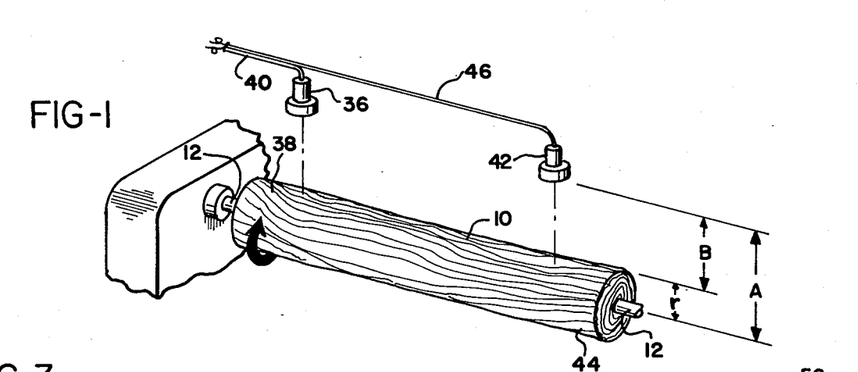
FIG. 1 is a diagrammatic view illustrating a log mounted on a veneer lathe spindle and sonic transducers mounted above, according to the present invention.
Figure 2:
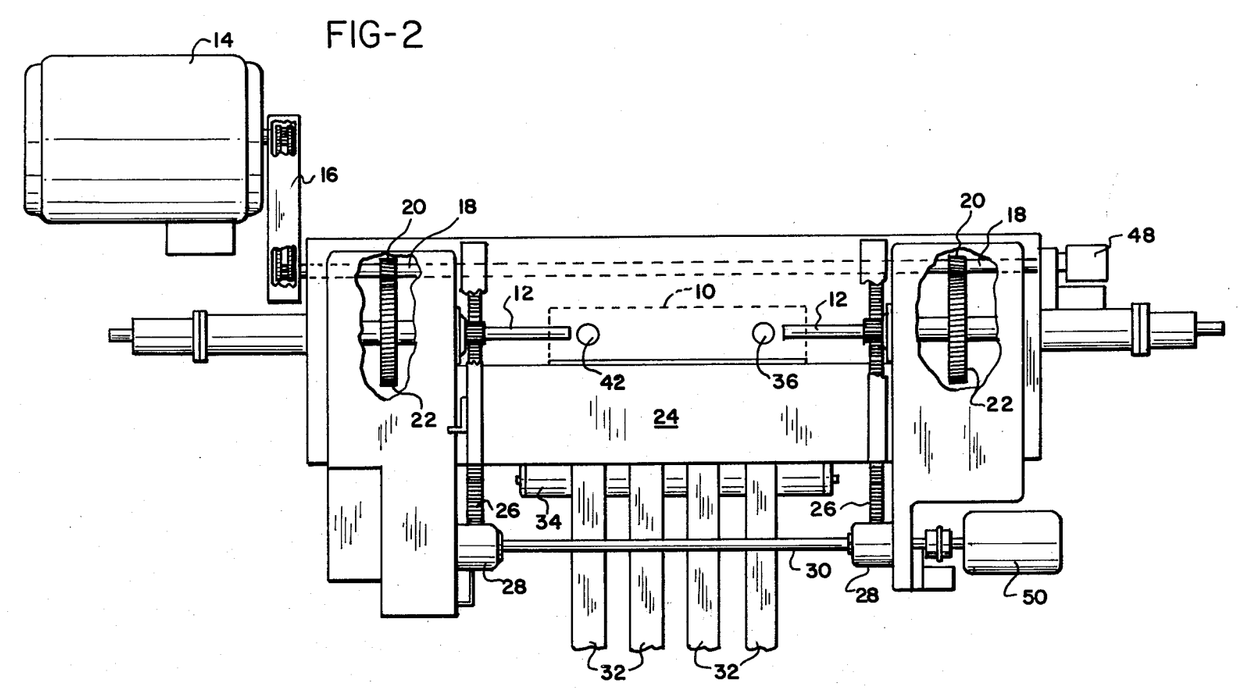
FIG. 2 is a plan view of a veneer lathe, with portions broken away, illustrating the positioning of the sonic transducers.

Reference is made to FIGS. 1 and 2 which illustrate a veneer lathe, constructed according to the present invention, for peeling wood from a log 10. The veneer lathe includes a rotatable lathe spindle 12 for engaging log 10 at opposite ends and a drive means, including motor 14, connected to spindle 12 for rotating the spindle and the log. Motor 14 is connected to spindle 12 by a drive linkage 16 which rotates a main drive shaft 18. Shaft 18 has mounted thereon gears 20 which engage gears 22 connected to opposite ends of spindle 12.

A lathe knife means, including knife 24, is provided for cutting log 10 mounted on spindle 12 and for peeling a sheet of veneer from the log as the log is rotated. Knife 24 is engaged by threaded shafts 26. Shafts 26 are, in turn, rotated by right angle drives 28 which are connected to a knife feed shaft 30. Shaft 30 is linked to motor 14 through a controllable linkage arrangement such that the knife 24 is advanced toward the log 10 by a predetermined distance during each rotation of the log 10. A sheet of veneer of desired thickness is thereby peeled from the log. The veneer peeled from the log passes onto a conveyor including belts 32 and belt roller 34 and is transported by the conveyor to a veneer clipper which cuts the veneer sheet into pieces of desired dimension.

The scanning device of the present invention provides a means for providing an indication of the radius of the peeler block or log 10 mounted on the lathe spindle 12. A first sonic transducer means 36 is mounted adjacent a first end 38 of the peeler block 10 for directing a burst of sonic energy toward the peeler block in response to a transducer input signal on line 40 and for providing a transducer output signal on line 40 in response to receipt of sonic energy reflected from the peeler block 10 adjacent the first end 38. A second sonic transducer means 42 is mounted adjacent a second end 44 of the peeler block 10, opposite the first end, for directing a burst of sonic energy toward the peeler block 10 in response to a transducer input signal on line 46. The second sonic transducer means 42 provides a transducer output signal on line 46 in response to receipt of sonic energy reflected from the peeler block 10 adjacent the second end 44 thereof.

Since typically a log is tapered in diameter along its length, transducers 36 and 42 are provided for measuring the radius of log 10 adjacent opposite ends thereof, approximately six inches inward from the ends of the logs. As a consequence, the minimum radius of the log 10 can be determined using only two transducers. It will also be appreciated that the radius of a log will vary around its periphery and it is therefore desirable to be able to measure the log radius at a plurality of angularly displaced positions around the log periphery. In order to accomplish this, the log 10 is rotated on the spindle 12 and a number of measurements are made during a revolution of the log. A tachometer pulse generator 48 is provided, connected to the main drive shaft 18 for supplying tachometer output signals for use by control circuitry, which may include a microprocessor control. By accumulating the tachometer output pulses, the control circuitry monitors the angular position of each successive radius measurement.

It should be noted that the transducers 36 and 42 are mounted above the peeler block 10 and direct bursts of sonic energy downward in a narrow, seven degree conical beam against the surface of the peeler block 10. The sonic energy bursts are thereafter reflected upward and received by the transducers. The downward orientation of the transducers is desirable in several respects. Veneer lathes of known construction typically have an open area above the spindle. As a consequence, no significant modification of an existing lathe is required to incorporate the scanning system of the present invention. Additionally, typically a substantial amount of sawdust and other wood debris is present in mills in which veneer lathes are utilized. By orienting the transducers to face downwardly, the sonic transmitting and receiving surfaces of the transducers do not accumulate sawdust, dirt, or other debris which might otherwise adversely affect their operation.

The veneer lathe further includes a knife position encoder 50 which is connected to the knife feed shaft 30. Encoder 50 provides an encoder output indicating the position of the knife 24. The output of encoder 50 may be utilized, if desired, to calibrate the scanner of the present invention since, as discussed more fully below, the radius measurements made by the scanner are dependent upon the time required for bursts of ultrasonic energy to travel downward from the transducers 36 and 42 and be reflected upward for reception by the transducers. Since the speed of sound is dependent upon the temperature, pressure and density of the air, and since variations in operation of the measuring circuitry, such as a shift in clock frequency may occur, recalibration of the scanning system is preferably accomplished at round up of each log.

As seen in FIG. 1, a burst of sonic energy is directed downward from a reference point defined by the position of transducer 42 toward the log surface. This reference point is a predetermined distance A from the axis of rotation of spindle 12. Distance A may, for example, be on the order of 25 inches. Sonic energy is reflected from the surface of log 10 and is subsequently received by the transducer 42. The time interval between transmission of the burst of sonic energy from the reference point and reception of reflected sonic energy at the reference point is measured. The distance B from the reference point to the log surface is then determined, based upon the measured time interval between transmission of the burst of sonic energy from the reference point and reception of reflected sonic energy at the reference point. The radius R of the log is therefore determined by subtracting the distance B from the reference point to the log surface from the predetermined distance A. In like manner, the radius of the log 10 adjacent the end 38 of the log 10 is determined based upon the distance from the transducer 36 to the axis of rotation of the spindle 12 and upon the time required for a burst of sonic energy to be transmitted to and reflected from the surface of the log 10. The radii of the log 10 adjacent each end may be compared by the control circuitry to determine the minimum log radius. The log 10 is thereafter rotated and the radii at a different angular orientation measured.

Figure 3:
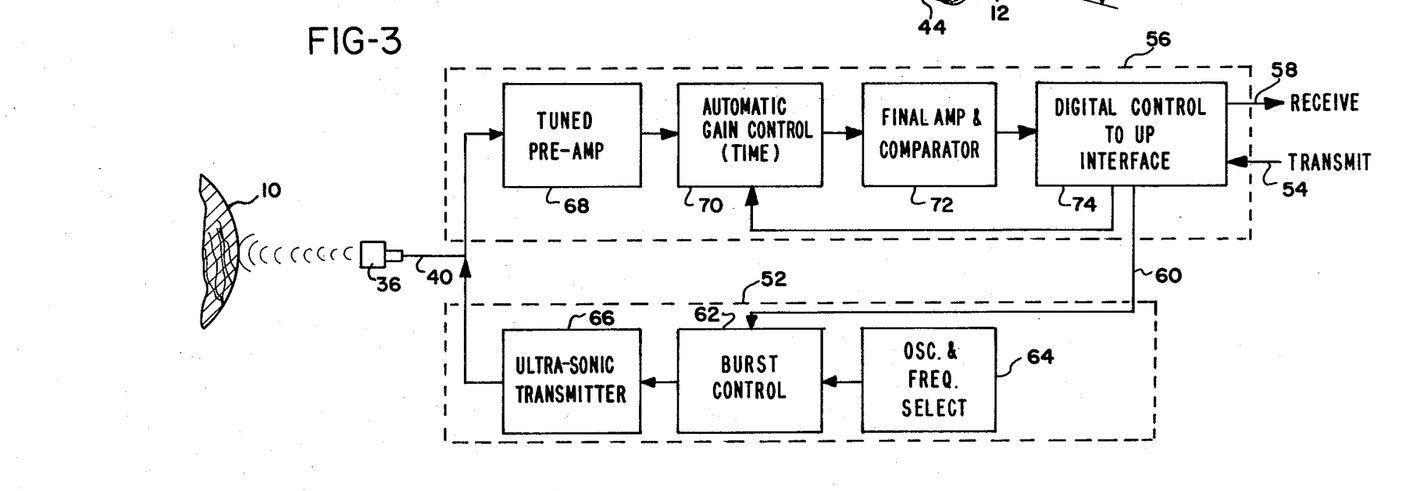
FIG. 3 is a block diagram illustrating the circuitry associated with a transducer.

Reference is now made to FIG. 3 of the drawings which illustrates the control circuitry utilized with one of the transducers. It will be appreciated that a similar circuit is provided for the other transducer, as well. A transmit circuit means 52 supplies transducer input signals to the line 40 in response to transmit control signals on line 54. A transducer receiver circuit means 56 provides reception signals on line 58 in response to transducer output signals from the transducer 36. The time delay between a transmit control signal on line 54 and the corresponding reception signal on line 58 provides an indication of the distance between the transducer 36 and the surface of the peeler block 10. The lines 54 and 58 are connected to control circuitry which may include, for example, a microprocessor unit which measures the time delay between the transmit control signal on line 54 and the reception signal on line 58.

When a transmit control signal is provided on line 54, an output on line 60 enables a burst control circuit 62 such that the oscillator output from oscillator circuit 64 is supplied to transmitter circuit 66. Transmitter circuit 66 provides a high frequency signal on line 40 to transducer 36, resulting in a burst of sonic energy being directed toward the peeler block 10 by the transducer 36.

A portion of the sonic energy is thereafter reflected by the surface of the peeler block 10 back to the transducer 36, which provides a transducer output signal on line 40 in response thereto. This signal is then supplied through a tuned preamp circuit 68 to an automatic gain control circuit 70. The gain of circuit 70 is initially relatively low, but after a specified time delay following a signal on line 60, the gain of circuit 70 is increased at a substantially uniform rate. This time controlled gain adjustment provides increased amplification for transducer output signals of a low level which result from scanning a peeler block of relatively small radius. A small radius block tends to disperse ultrasonic signals. Additionally, a reduction in the radius of the peeler block results in a greater path length for transmission to and reflection from a peeler block, thereby reducing the amplitude of the reflected signals.

A signal is supplied by the gain control circuit 70 to a final amplifier and comparator circuit 72 which compares the output of the gain control circuit with a reference signal level to determine whether this output is a result of a transducer output signal generated upon receipt of reflected sonic energy, or whether the transducer output signal has resulted from ambient noise in the lathe environment. Finally, if it is determined that the input to circuit 72 exceeds the reference level, a signal is supplied to interface circuit 74 which provides the reception signal on line 58.

Figure 4:
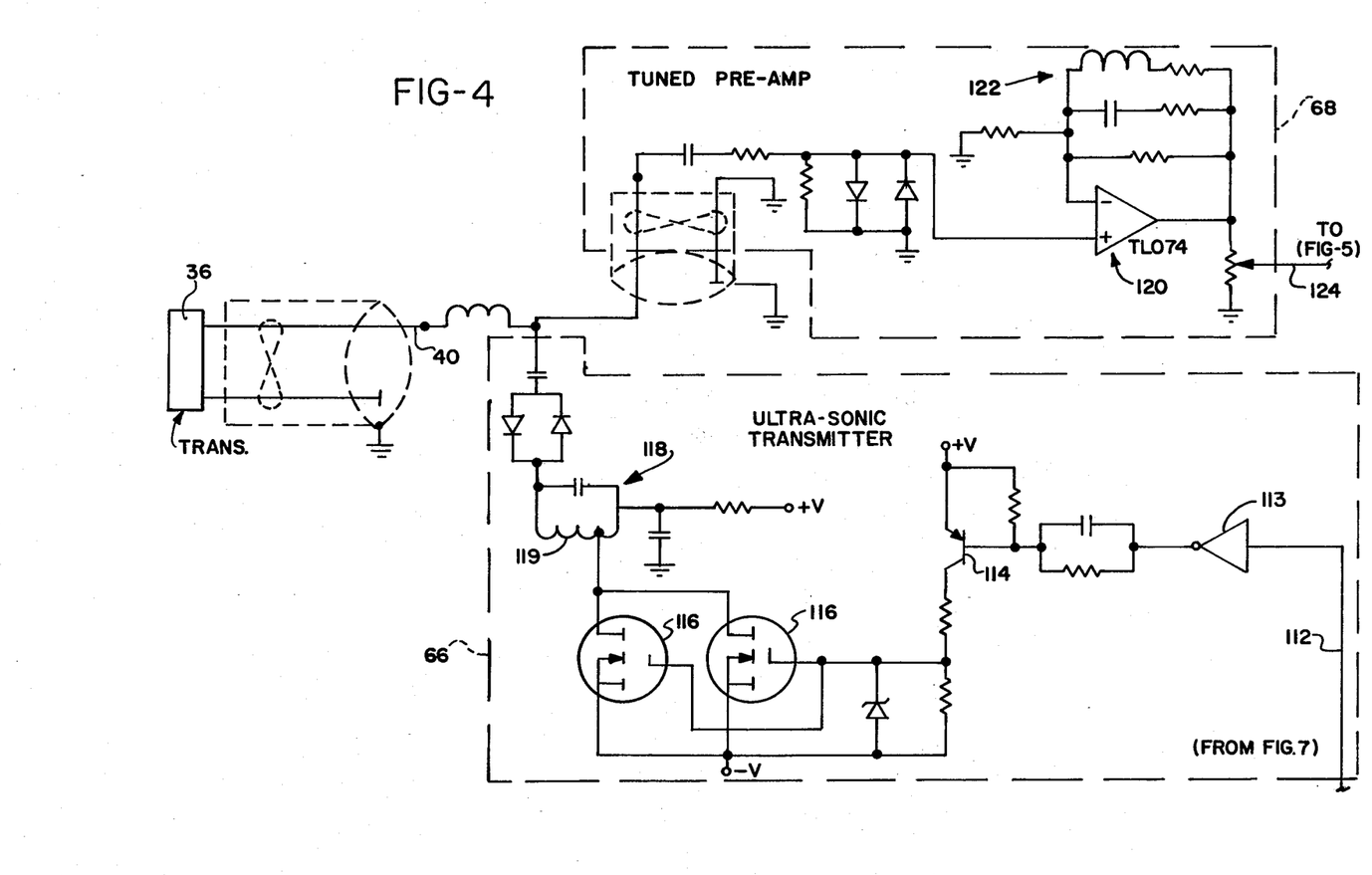
FIG. 4 is a schematic diagram showing the tuned preamplifier and ultrasonic transmitter circuits in greater detail.
Figure 5:
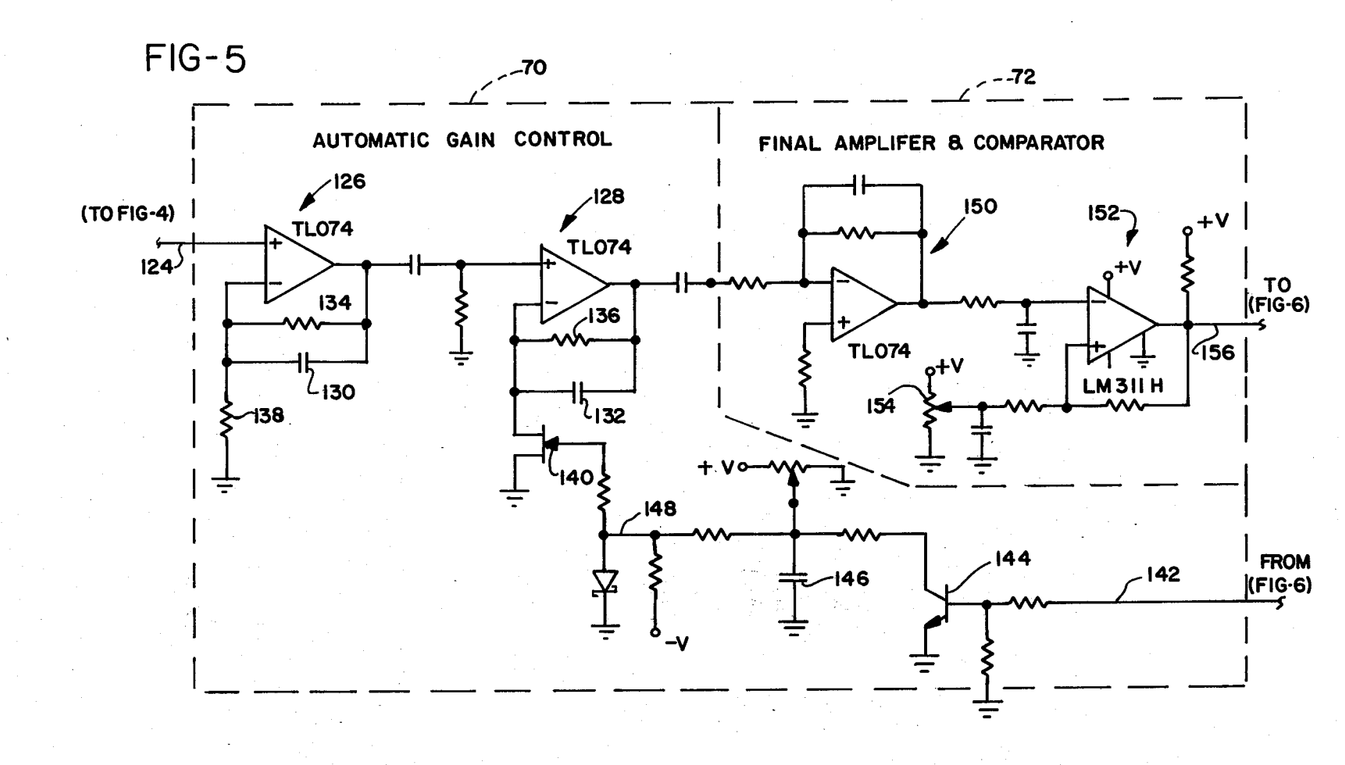
FIG. 5 is a schematic diagram showing the automatic gain control and final amplifier and comparator circuits in greater detail.
Figure 6:
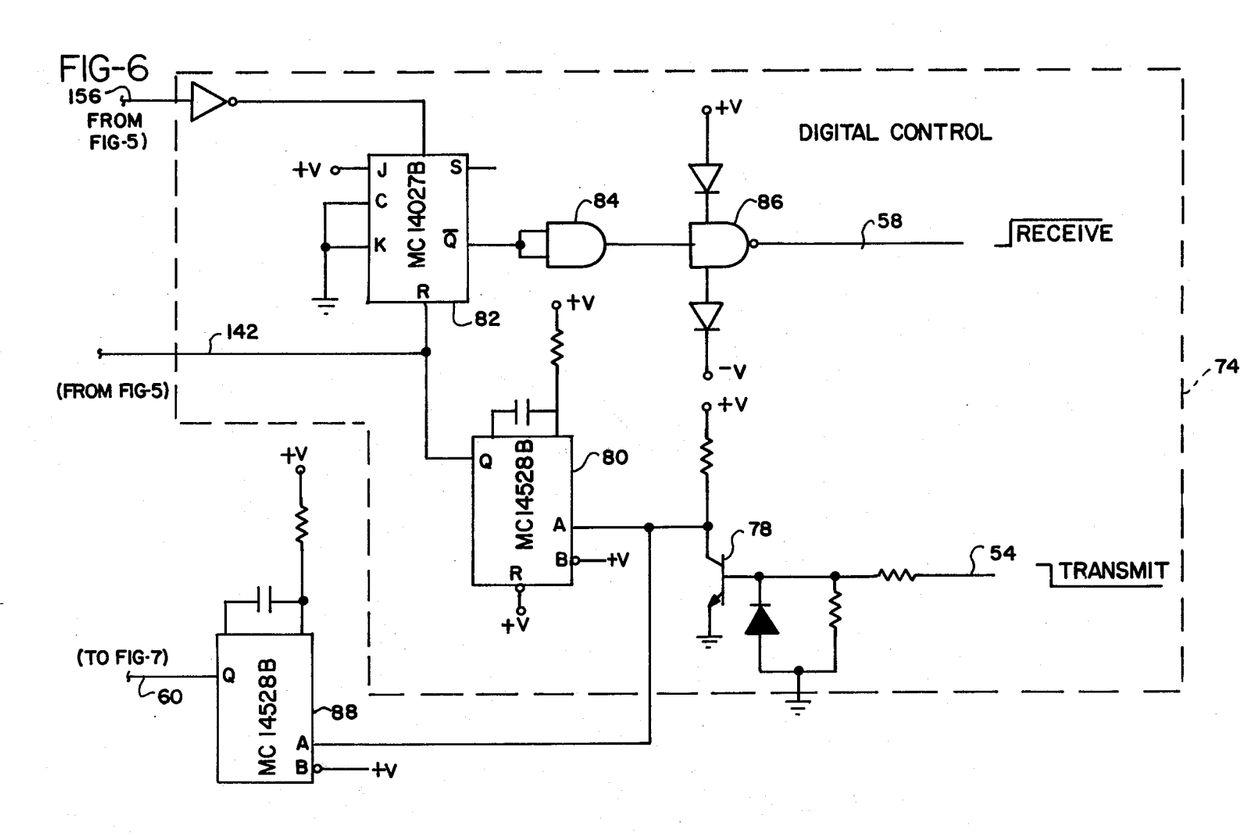
FIG. 6 is a schematic diagram illustrating the digital control circuit in greater detail.

FIGS. 4–7 illustrate the transmit circuit 52 and the receiver circuit 56 in greater detail. When it is desired to take a radius measurement, a negative going transmit pulse is supplied to line 54, switching transistor 78 off and providing a positive going pulse to the A input of one-shot multivibrator 80 (FIG. 6). The Q output of one-shot 80 is supplied to the reset input of flip-flop 82 and holds flip-flop 82 in a reset condition for a predetermined time period required for transmission of a burst of sonic energy by the transducer 36. Thus, flip-flop 82 is disabled during transmission of the sonic energy burst and a reception signal is not provided by the flip-flop 82 to line 58, via AND gate 84 and NAND gate 86, until the reflected sonic energy is received a predetermined time following transmission of the sonic burst. The Q output of one shot 80 remains high during this predetermined time period. The positive going pulse from transistor 78 is also supplied to one shot multivibrator circuit 89 which, in turn, supplies a positive going pulse to set circuit 88 (FIG. 7), thus enabling AND gate 90.

Figure 7:
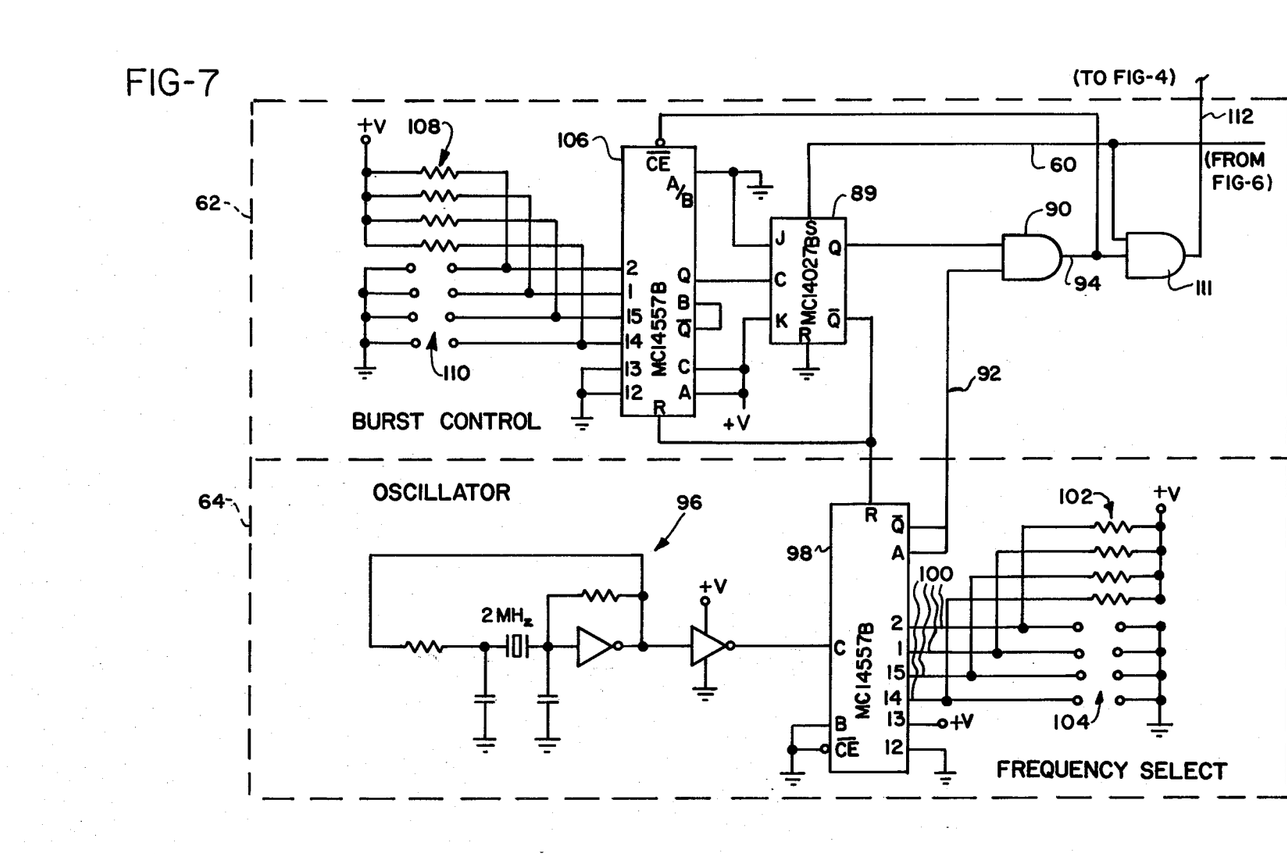
FIG. 7 is a schematic diagram illustrating the burst control and oscillator circuits in greater detail.

AND gate 90 thereafter supplies the high frequency oscillator output signal from oscillator circuit 64 on line 92 to line 94. Oscillator circuit 64 includes a fixed frequency crystal oscillator 96, the output of which is reduced in frequency by programmable shift register 98 and supplied to line 92. The frequency division performed by shift register 98 is controlled by selection of the signals supplied to control input lines 100 via resistors 102 or shunting lines connected across terminals 104. Programmable shift register 106 counts the number of high frequency pulses supplied to line 94 and after a predetermined number of pulses, as specified by resistors 108 and shunting conductors across terminals 110, clocks the flip flop 89 into a reset state, thus disabling AND gate 90.

The pulses supplied to line 94 are gated with the output pulse from one shot circuit 88 on line 60 by AND gate 111 and supplied to transmitter circuit 66 via line 112. These pulses, inverted by inverter 113, control switching of transistor 114. The switching state of transistor 114 controls parallel-connected field effect transistors 116 which excite tuned circuit 118. Circuit 118 steps up the voltage of the pulses across the secondary stage of autotransformer 119, the output of which is coupled to line 40.

The signal on line 40 is supplied to ultrasonic transducer 36 which may, for example, be a Wesmar transducer Model No. LMS-15K. It should be noted that during this transmission cycle, the flip-flop 82 is held in a reset state by one-shot 80 such that, even though the signal supplied to the transducer 36 is also supplied to the tuned preamp circuit 68, an erroneous reception signal is not produced.

After the one-shot 80 has reset, the circuit 56 is enabled for detection of reflected sonic energy from the peeler block. When such energy is received by transducer 36, a transducer output signal is supplied to tuned preamplifier circuit 68 via line 40. The circuit 68 includes amplifier 120, having a tuned feedback circuit 122 which is tuned to receive frequency of the signals provided by the oscillator circuit 64. The output from the tuned preamp circuit 68 is supplied to automatic gain control circuit 70, via line 124, which includes series connected amplifiers 126 and 128. Each of the amplifiers includes a capacitor 130 and 132 for high frequency roll off, as well as resistors 134 and 136 which, in conjunction with resistor 138 and field effect transistor 140, respectively, determine the gain of the amplifiers.

During the transmit time period, the Q output of one-shot 80 is high and this high signal on line 142 holds transistor 114 ON. As a consequence, capacitor 146 is grounded through transistor 144. When one-shot 80 times out and its Q output goes low, transistor 144 is switched OFF and capacitor 146 is charged. Thus, a ramp signal is supplied to line 148 which results in a decrease in the effective source-to-drain resistance of field effect transistor 140. This resistance decrease, in turn, increases the gain provided by amplifier 128 such that the somewhat weaker signals provided by reflection through a greater distance from the surface of a small peeler block are compensated. The output of automatic gain control circuit 70 is thereafter supplied to amplifier and comparator circuit 72, including amplifier 150 and comparator 152. The input to comparator 152 from amplifier 150 is compared with a reference level potential set by potentiometer 154 and, if the output from amplifier 150 exceeds this reference level, a negative going signal is supplied to output line 156.

As seen in FIG. 6, a negative going signal on line 156 results in flip flop 82 being set such that its Q output goes low. This is inverted by NAND gate 86 with the result that a positive going reception signal is supplied to line 58.

The time delay between signals on lines 54 and 58 is then measured by a simple timing circuit. The distance from the transducer 36 to the surface of the peeler block 10 is determined simply by multiplying the measured time delay by an appropriate scale factor, which factor may be adjusted, as discussed above, in dependence upon variations in air temperature and pressure and variations in circuit operation.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. A scanning device for use with a veneer lathe for providing an indication of the radius of a peeler block mounted on the lathe spindle, comprising:

first sonic transducer means, mounted adjacent a first end of said peeler block, for directing a burst of sonic energy toward said peeler block in response to a transducer input signal, and for providing a transducer output signal in response to receipt of sonic energy reflected from said peeler block adjacent the first end thereof, second sonic transducer means, mounted adjacent a second end of said peeler block opposite said first end, for directing a burst of sonic energy toward said peeler block in response to a transducer input signal, and for providing a transducer output signal in response to receipt of sonic energy reflected from said peeler block adjacent the second end thereof, transmit circuit means for supplying said transducer input signals to said first and second sonic transducer means in response to transmit control signals, and transducer receiver circuit means for providing a reception signals in response to transducer output signals from said first and second sonic transducer means, whereby the time delays between said transmit control signals and said reception signals provide an indication of the distance between said first transducer means and the surface of said peeler block adjacent the first end thereof and an indication of the distance between said second transducer and the surface of said peeler block adjacent the second end thereof for calculation of peeler block radius adjacent said first and second ends thereof.

2. The scanner device of claim 1, further comprising angular encoder means, connected to the spindle of said veneer lathe, for providing an indication of the angular orientation of said peeler block during scanning thereof.

3. The device of claim 1 in which said transducers are mounted above said peeler block for directing said bursts of sonic energy downward thereagainst and for receiving upward reflections of sonic energy from said peeler block.

4. A veneer lathe for peeling wood veneer from a log, comprising:

a rotatable lathe spindle for engaging a log at opposite ends thereof, drive means connected to said spindle for rotating said spindle and a log engaged thereby, lathe knife means for cutting a log mounted on said spindle and peeling a sheet of veneer from said log as said log is rotated, means for advancing said knife means toward said log at a controlled rate during rotation of a log such that a sheet of veneer of substantially uniform thickness is peeled from said log, and at least one sonic transducer, mounted adjacent said log, for directing bursts of sonic energy toward said log and receiving reflected sonic energy therefrom during operation of said lathe, whereby the time delay between transmission of a burst of sonic energy from said transducer and reception of reflected sonic energy by said transducer provides an indication of the radius of said log.

5. The veneer lathe of claim 4 in which said transducer is mounted above said log for directing bursts of sonic energy downward thereagainst and receiving upward reflected sonic energy from the surface of said log.

6. The lathe of claim 4 further comprising an angular encoder connected to said spindle of said lathe for providing an indication of the angular orientation of said log during transmission and reception of bursts of sonic energy by said transducer.

7. The lathe of claim 4 in which said lathe includes first and second sonic transducers, and in which said first transducer directs bursts of sonic energy downward for reflection from the log surface adjacent a first end of said log, and said second transducer directs bursts of sonic energy downward for reflection from the log surface adjacent a second end of said log, opposite said first end thereof.

8. A method of determining the radius of a log mounted for axial rotation on the spindle of a veneer lathe, comprising the steps of:

transmitting a burst of sonic energy from a reference point toward the log surface, said reference point being a predetermined distance from the axis of rotation of the spindle,     receiving sonic energy at said reference point reflected from the log surface,     measuring the time interval between transmission of said burst of sonic energy from said reference point and reception of reflected sonic energy at said reference point,     determining the distance from said reference point to said log surface based upon the measured time interval between transmission of said burst of sonic energy from said reference point and reception of reflected sonic energy at said reference point, and     determining the radius of the log by subtracting the distance from said reference point to said log surface from said predetermined distance.

9. The method of claim 8 in which the step of transmitting a burst of sonic energy from a reference point toward the log surface includes the step of transmitting a burst of sonic energy toward the surface of the log adjacent a first end of the log, whereby the radius of said log adjacent the first end thereof is determined.

10. The method of claim 9 further comprising the steps of:

transmitting a burst of sonic energy from a second reference point toward the surface of the log adjacent a second end of the log, opposite said first end, said second reference point being a second predetermined distance from the axis of rotation of the spindle,     receiving sonic energy at said second reference point reflected from the log surface adjacent said second end of said log,     measuring the time interval between transmission of said burst of sonic energy from said second reference point and reception of reflected sonic energy at said second reference point,     determining the distance from said second reference point to said log surface adjacent said second end of the log based upon the measured time interval between transmission of said burst of sonic energy from said second reference point and reception of reflected sonic energy at said second reference point, and     determining the radius of the log adjacent said second end thereof by subtracting the distance from said second reference point to said log surface adjacent said second end of said log from said second predetermined distance.

11. The method of claim 10 further comprising the step of comparing the radius of said log adjacent the first end thereof with the radius of said log adjacent the second end thereof to determine the minimum log radius.

12. The method of claims 9, 10, or 11, further comprising the steps of rotating said log on the spindle of said veneer lathe, and     repeatedly measuring the radius of said log during rotation thereof at circumferentially displaced points therearound.

* * * * *